United States Patent
Majumder

(10) Patent No.: US 9,935,463 B2
(45) Date of Patent: Apr. 3, 2018

(54) REDUNDANT POINT OF COMMON COUPLING (PCC) TO REDUCE RISK OF MICROGRID'S ISLANDING

(71) Applicant: ABB TECHNOLOGY LTD, Zürich (CH)

(72) Inventor: Ritwik Majumder, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 287 days.

(21) Appl. No.: 14/915,967

(22) PCT Filed: Sep. 3, 2013

(86) PCT No.: PCT/EP2013/068163
§ 371 (c)(1),
(2) Date: Mar. 2, 2016

(87) PCT Pub. No.: WO2015/032420
PCT Pub. Date: Mar. 12, 2015

(65) Prior Publication Data
US 2016/0285268 A1    Sep. 29, 2016

(51) Int. Cl.
*H02J 3/38* (2006.01)
*H02J 3/48* (2006.01)

(52) U.S. Cl.
CPC ............... *H02J 3/381* (2013.01); *H02J 3/38* (2013.01); *H02J 3/48* (2013.01); *H02J 2003/388* (2013.01); *Y02P 80/14* (2015.11)

(58) Field of Classification Search
CPC ...................................................... H02J 3/381
(Continued)

(56) References Cited

U.S. PATENT DOCUMENTS

| 8,421,270 B1 | 4/2013 | Miller et al. |
| 8,447,435 B1 | 5/2013 | Miller et al. |

(Continued)

FOREIGN PATENT DOCUMENTS

| CN | 102841279 A | 12/2012 |
| CN | 102856924 A | 1/2013 |

(Continued)

OTHER PUBLICATIONS

English translation of the Chinese Office Action dated Oct. 9, 2017, for Chinese Application No. 201380079739.X.
(Continued)

*Primary Examiner* — Joseph Chang
(74) *Attorney, Agent, or Firm* — Birch, Stewart, Kolasch & Birch, LLP

(57) ABSTRACT

A microgrid connecting at least one distributed electricity generator includes a first switch configured for, in a closed position, connecting the microgrid to a first network line at a first point of common coupling (PCC) and for, in an open position, disconnecting the microgrid from the first network line at the first PCC; a second switch configured for, in a closed position, connecting the microgrid to a second network line at a second PCC, and for, in an open position, disconnecting the microgrid from the second network line at the second PCC; and a control unit configured for, when an islanding event has been detected when the second switch is in its closed position and the first switch is in its open position, acting to close the first switch, bringing it to its closed position.

20 Claims, 2 Drawing Sheets

(58) Field of Classification Search
USPC .......................................................... 307/84
See application file for complete search history.

(56) References Cited

U.S. PATENT DOCUMENTS

2011/0276192 A1* 11/2011 Ropp ..................... H02J 3/383
                                                                        700/293
2013/0155734 A1     6/2013   El-Barbari et al.
2013/0187454 A1     7/2013   Timbus et al.

FOREIGN PATENT DOCUMENTS

| CN | 103066621 A | 4/2013 |
| CN | 103081274 A | 5/2013 |
| EP | 2 600 479 A1 | 6/2013 |
| WO | WO 2012/032111 A2 | 3/2012 |
| WO | WO 2012/064409 A2 | 5/2012 |

OTHER PUBLICATIONS

Majumder, "Modeling, Stability Analysis and Control of Microgrid", QUT, Queensland, Australia, Feb. 2010, XP055115574, pp. 1-182.

* cited by examiner

REDUNDANT POINT OF COMMON COUPLING (PCC) TO REDUCE RISK OF MICROGRID'S ISLANDING

TECHNICAL FIELD

The present disclosure relates to a microgrid connecting at least one distributed electricity generator and having first and second points of common couplings (PCC) to an alternating current (AC) power grid.

BACKGROUND

A microgrid is a localized grouping of electricity generation, energy storage, and loads that normally operates connected to a traditional centralized grid (macrogrid) via a point of common coupling (PCC). This single point of common coupling with the macrogrid can be disconnected, islanding the microgrid. Microgrids are part of the structure for so called distributed generation (DG) aiming at producing electrical power locally from many small energy sources.

A microgrid (in grid connected mode, i.e. connected to the macrogrid) supplies the optimized or maximum power outputs from the connected DG sites and the rest of the power is supplied by the macrogrid. The microgrid is connected to the macrogrid at a PCC through a controllable switch. This grid connection is lost during grid fault and microgrid is islanded.

U.S. Pat. No. 8,447,435 generally discloses connection between and control of a plurality of microgrids with a PCC to the macrogrid.

To avoid islanding, multiple PCC can be used. Multiple PCC connection may provide improved grid reliability but power management, protection, power flow control, stability and islanding detection (at one PCC point) become more complex.

SUMMARY

It is an objective of the present invention to alleviate the problems of the prior art mentioned above, by reducing the risk of islanding while avoiding the increased complexity of using a plurality of PCCs. The solution of the present invention is to connect at only one PCC, but being able to connect via another PCC when islanding is detected.

According to an aspect of the present invention, there is provided a microgrid which is connecting at least one distributed electricity generator. The microgrid comprises a first switch configured for, in a closed position, connecting the microgrid to a first network line at a first point of common coupling (PCC) and for, in an open position, disconnecting the microgrid from the first network line at the first PCC; a second switch configured for, in a closed position, connecting the microgrid to a second network line at a second PCC, and for, in an open position, disconnecting the microgrid from the second network line at the second PCC; and a control unit configured for acting to close the first switch, bringing it to its closed position, when an islanding event has been detected when the second switch is in its closed position and the first switch is in its open position.

According to an aspect of the present invention, there is provided a method performed by a control unit for a microgrid. The microgrid connects at least one distributed electricity generator and comprises a second switch in a closed position, connecting the microgrid to a second network line at a second PCC, and a first switch in an open position, disconnecting the microgrid from a first network line at a first PCC. The method comprises detecting an islanding event occurring; and acting to close the first switch, bringing it to its closed position, in response to the detected islanding. Thus, the microgrid is connected to the second network line via the second switch, when islanding is detected prompting the closing of the first switch for connecting the microgrid to the first network line.

By means of embodiments of the present invention, islanding can be handled by having a plurality of available PCC:s, while control complexity is kept low by not having all the available PCC:s active at the same time.

In some embodiments, the control unit is also configured for detecting the islanding event occurring, and the acting to close the first switch is in response to the detected islanding. Alternatively, the islanding may be detected in some other way, e.g. manually, and information about the occurred islanding may be inputted to the control unit.

In some embodiments, the control unit is configured for acting to open the second switch, bringing it to its open position, in response to the detected islanding. This may be convenient to avoid any interference to occur via the second PCC.

In some embodiments, the first network line is comprised in the same network grid as the second network line.

In some other embodiments, the first network line is comprised in a first network grid and the second network line is comprised in a second network grid, different than the first network grid.

In some embodiments, the control unit is configured for receiving information about a voltage of at least one bus in the microgrid and a power of the distributed generator.

In some embodiments, the control unit is configured for periodically receiving information about a power flow in the microgrid.

In some embodiments, the control unit is configured for periodically receiving information about a grid voltage of the first network line when the first switch is in its open position.

In some embodiments, the control unit is configured for calculating a flow reference for the first PCC when the first switch is in its open position, and for using said power reference for controlling power flow over the first PCC when the first switch is in its closed position.

In some embodiments, the control unit comprises a central controller as well as a first interface controller for controlling power flow over the first PCC and a second interface controller for controlling power flow over the second PCC.

In some embodiments, the microgrid comprises a third switch configured for, in a closed position, connecting the microgrid to a third network line at a third PCC, and for, in an open position, disconnecting the microgrid from the third network line at the third PCC; wherein the control unit is configured for acting to close the third switch, bringing it from its open position to its closed position, in response to the detected islanding.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
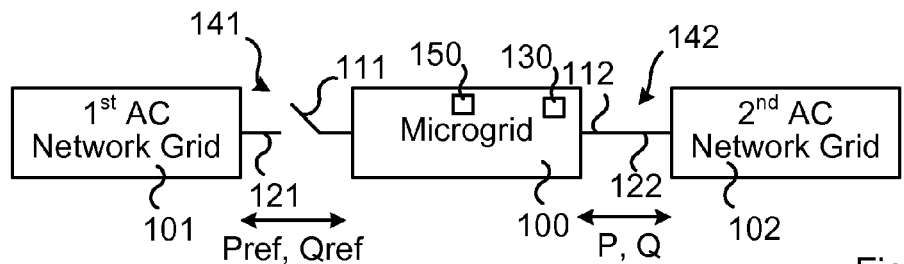
FIG. 1 is a schematic block diagram of an embodiment of a microgrid in accordance with the present invention.

FIG. 1 schematically illustrates an embodiment of a microgrid 100. The microgrid comprises at least one distributed generator (DG) 130, often several DG:s 130, and possibly one or several loads. The DG 130 may typically generate direct current (DC) why the microgrid may typically be a DC grid. The microgrid 100 comprises a first switch 111 configured for, in a closed position, connecting the microgrid 100 to a first network line 121 at a first PCC 141 and for, in an open position, disconnecting the microgrid from the first network line at the first PCC. The first network line 121 is part of a first network grid 101, such as an alternating current (AC) grid e.g. a public AC network or macrogrid. The microgrid 100 comprises also a second switch 112 configured for, in a closed position, connecting the microgrid 100 to a second network line 122 at a second PCC 142, and for, in an open position, disconnecting the microgrid from the second network line at the second PCC. The second network line 122 may also be part of the first network grid 101, or it may be part of a different (second) network grid 102, such as an alternating current (AC) grid e.g. a public AC network or macrogrid, which is separate from the first network grid 101. The microgrid 100 also comprises a control unit 150 for controlling the opening and closing of the first and second switches 111 and 112, as well as for performing other control of e.g. flow and voltages of the microgrid 100 and/or the first and second PCC 141 and 142 as desired. FIG. 1 shows the situation where the second switch 112 is in its closed position and the first switch 111 is in its open position, why only the second PCC 142 is active, a flow of electrical power (P, Q), where P is active power and Q is reactive power, passing over the second PCC 142. Depending on whether the power produced by the at least one DG 130 is more or less than any power consumed by any loads in the microgrid 100, the flow over the second PCC 142 may be from the microgrid 100 and into the network 102 via the second network line 122, or from the network 102 via the second network line 122 and into microgrid 100. Although the microgrid 100 is disconnected from the first network line 121, the control unit 150 may still obtain information relating to the first PCC 141 and may calculate reference(s) ($P_{ref}$ and $Q_{ref}$) for the flow over the first PCC 141 in case the first PCC needs to be activated (closing the first switch 111) due to a failure (islanding) at the second PCC 142. The power flow (P, Q) before islanding may be used by the control unit 150 to calculate the power references ($P_{ref}$, $Q_{ref}$) for the new (first) PCC 141.

Figure 2:
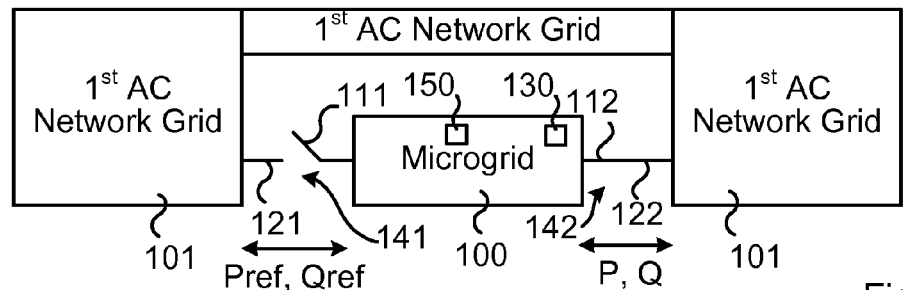
FIG. 2 is a schematic block diagram of another embodiment of a microgrid in accordance with the present invention.

FIG. 2 schematically illustrates another embodiment of a microgrid 100. The figure is similar to FIG. 1 above and reference is made to that discussion. FIG. 2 specifically shows the situation where the first network line 121 and the second network line 122 both are part of the same network grid, the first network grid 101. Thus, the first network line 121 may be comprised in the same network grid 101 as the second network line 122.

Figure 3:
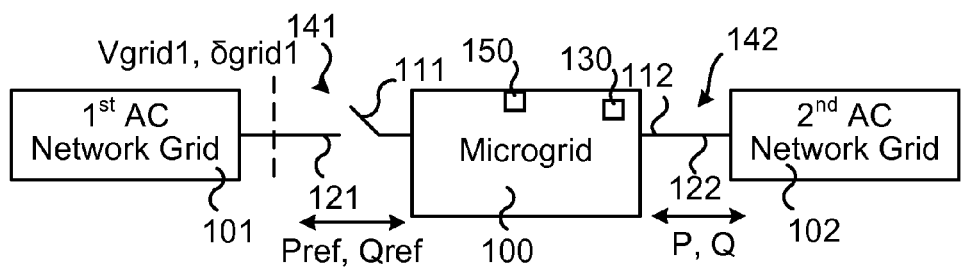
FIG. 3 is a schematic block diagram of another embodiment of a microgrid in accordance with the present invention.

FIG. 3 schematically illustrates another embodiment of a microgrid 100. The figure is similar to FIG. 1 above and reference is made to that discussion. FIG. 3 specifically illustrates an embodiment where the control unit 150 receives measurements of the voltage ($V_{grid1}$ and $\delta_{grid1}$), where $V_{grid1}$ is the voltage magnitude and $\delta_{grid1}$ is the voltage phase angle, at the first PCC 141. These voltage measurements may then be used for calculating the power references (P, Q) for the first PCC 141, for use if the first PCC 141 needs to be activated by closing the first switch 111. Thus, the control unit 150 may be configured for receiving, e.g. periodically, information about a grid voltage of the first network line 121, e.g. at the first PCC 141, when the first switch 111 is in its open position.

Figure 4:
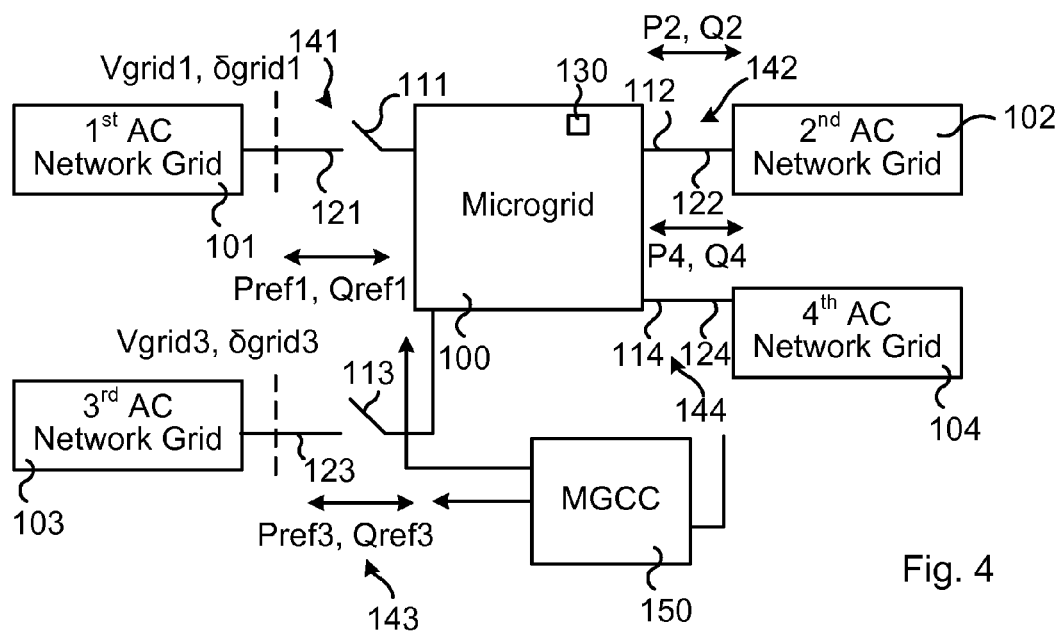
FIG. 4 is a schematic block diagram of another embodiment of a microgrid in accordance with the present invention.

FIG. 4 schematically illustrates another embodiment of a microgrid 100, having more than two PCC:s, here four PCC:s. In addition to the first and second switches 111 and 112, the microgrid 100 also comprises a third switch 113 able to connect, in its closed position, the microgrid to a third network grid 103 via a third network line 123, and a fourth switch 114 able to connect, in its closed position, the microgrid to a fourth network grid 104 via a fourth network line 124. As shown in FIG. 4, the microgrid 100 may be connected over more than one PCC, and/or may have more than one PCC in reserve in case of islanding. Here, the microgrid has two active PCC:s, the second PCC 142 by means of the second switch 112 being closed and the fourth PCC 144 by means of the fourth switch 114 being closed. Further, the microgrid has two inactive PCC:s, the first PCC 141 which can be activated by closing the first switch 111 and the third PCC 143 which can be activated by closing the third switch 113. Thus, the microgrid 100 may further comprise a third switch 113 configured for, in a closed position, connecting the microgrid 100 to a third network line 123 at a third PCC 143, and for, in an open position, disconnecting the microgrid from the third network line at the third PCC; wherein the control unit 150 is also configured for acting to close the third switch 113, bringing it from its open position to its closed position, in response to the detected islanding. The control unit 150 is here shown schematically outside of the microgrid for easier display in the figure, and is called a microgrid central control 150. Although, the control unit 150 is herein described as being part of the microgrid 100, it may of course physically be located elsewhere, e.g. in a control room, not necessarily close to the DG(s) and any loads of the microgrid 100. As is schematically illustrated in the figure, the control unit 150 may obtain measurements of flow (P, Q) of the active PCC:s, i.e. $P_2$ and $Q_2$ of the second PCC 142 and $P_4$ and $Q_4$ of the fourth PCC 144 in order to be able to calculate the flow references for the inactive PCC:s, i.e. $P_{ref1}$ and $Q_{ref1}$ of the first PCC 141 and $P_{ref3}$ and $Q_{ref3}$ of the third PCC 143. Additionally or alternatively, the flow references may be based on voltage measurements of the inactive PCC:s obtained by the control unit 150, i.e. $V_{grid1}$ and $\delta_{grid1}$ of the first PCC 141 and $V_{grid3}$ and $\delta_{grid3}$ of the third PCC 143. In some embodiments, the microgrid 100 is not grid interfaced via a power flow controller (through power flow control, $P_{ref1}$ and $Q_{ref1}$). Then the power flow is determined only by the grid voltage ($V_{grid1}$ and $\delta_{grid1}$) which is used to calculate reference voltage for microgrid controllable buses. The control unit 150 may also or alternatively obtain information about a voltage of at least one bus in the microgrid 100 and a power of the distributed generator 130 in order to be able to better control the microgrid. In addition to the microgrid central controller (MGCC), the control unit may comprise interface controllers at each PCC, e.g. for executing opening and closing of the respective switches at each PCC and/or for performing flow and/or voltage measurements at the respective PCC:s as desired.

Figure 5:
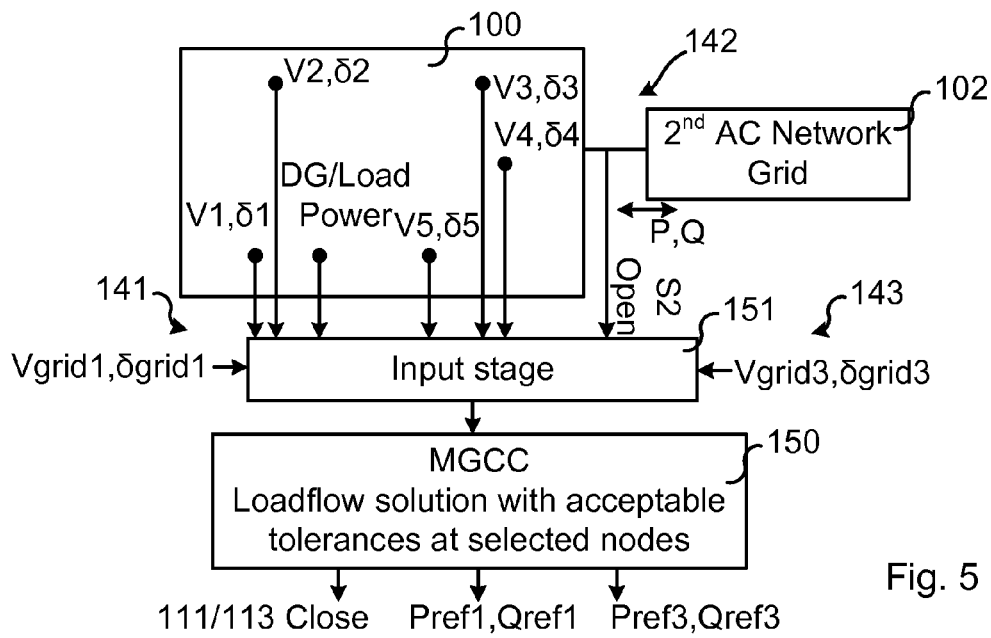
FIG. 5 is a schematic block diagram of another embodiment of a microgrid in accordance with the present invention.
Figure 6:
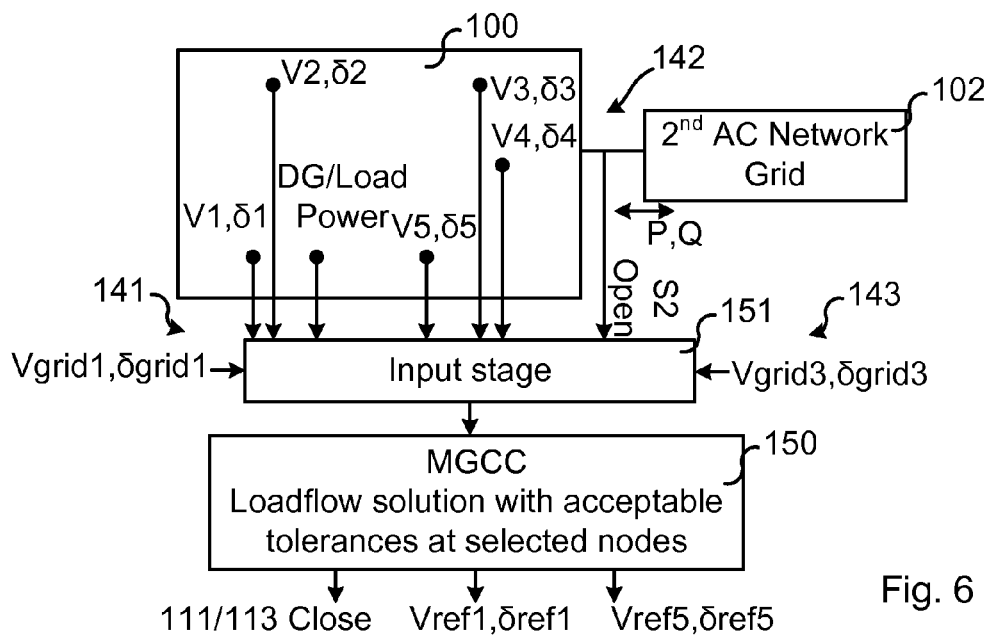
FIG. 6 is a schematic block diagram of another embodiment of a microgrid in accordance with the present invention.

FIGS. 5 and 6 illustrates how the power flow references for inactive PCC:s, here the first PCC 141 and the third PCC 143, are calculated by the control unit 150. An input stage 151 of the control unit 150 receives information about measurements made, based on which measurements the control unit 150 calculates the flow references (P, Q) for the inactive PCC:s 111 and 113. In addition to the flow references, the control unit outputs a command for closing the first and/or the third switch 111/113 is islanding is detected die to failure at the second PCC 142. If the microgrid 100 is not connected through power flow controller (as shown in FIG. 6), voltage references for microgrid controllable buses are generated instead of flow references as in FIG. 5. As discussed above and as illustrated in FIGS. 5 and 6, input measurement information to the control unit 150 may comprise any or all of power flow (P, Q) of active PCC(s) 142; closed switches 112 and open switches 111, 113; node voltages in the microgrid 100; power output of the DG(s) 130, power consumption of any loads in the microgrid; and grid voltage (V, δ) at inactive PCC(s) 111 and 113. The power references are calculated through load flow imposing acceptable voltage variation at microgrid buses. The power/voltage references and switch closing command are then sent to the inactive PCC(s) which should be activated e.g. to PCC interface controller(s) of the inactive PCC(s). This is an example of how the control unit 150 may act to activate a PCC in case of islanding, by acting to close a corresponding switch.

Figure 7:
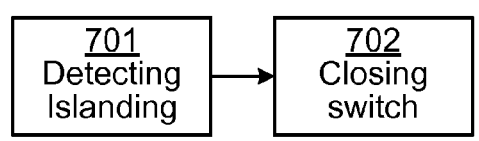
FIG. 7 is a schematic flow chart of an embodiment of a method in accordance with the present invention.

FIG. 7 is a schematic flow chart of an embodiment of a method of the present invention. The method is performed by an embodiment of a control unit 150 of a microgrid 100 as discussed herein. The control unit detects 701 that an islanding event has occurred. Typically, an active PCC 142 has failed, islanding the microgrid 100. The control unit then acts 702 to close the first switch 111 which was previously open, bringing it to its closed position, in response to the detected 701 islanding. Thereby, the first PCC 141 is activated and is used instead of the second PCC 142.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A microgrid connecting at least one distributed electricity generator, the microgrid comprising:
    a first switch configured for, in a closed position, connecting the microgrid to a first network line at a first point of common coupling, PCC, and for, in an open position, disconnecting the microgrid from the first network line at the first PCC;
    a second switch configured for, in a closed position, connecting the microgrid to a second network line at a second PCC, and for, in an open position, disconnecting the microgrid from the second network line at the second PCC; and
    a control unit configured for, when the second switch is in the closed position and the first switch is in the open position:
        periodically receiving information about a grid voltage at the first PCC;
        detecting an islanding event at the second PCC; and
        in response to the detected islanding event, acting to close the first switch for bringing the first switch to the closed position.

2. The microgrid of claim 1, wherein the control unit is also configured for acting to open the second switch, bringing the second switch to the open position, in response to the detected islanding event.

3. The microgrid of claim 1, wherein the first network line is comprised in the same network grid as the second network line.

4. The microgrid of claim 1, wherein the first network line is comprised in a first network grid and the second network line is comprised in a second network grid, different than the first network grid.

5. The microgrid of claim 1, wherein the control unit is also configured for receiving information about a voltage of at least one bus in the microgrid and a power of the distributed electricity generator.

6. The microgrid of claim 1, wherein the control unit is also configured for periodically receiving information about a power flow in the microgrid.

7. The microgrid of claim 1, wherein the control unit is also configured for calculating a flow reference for the first PCC when the first switch is in the open position, and for using said power reference for controlling power flow over the first PCC when the first switch is in the closed position.

8. The microgrid of claim 1, wherein the control unit comprises a central controller, a first interface controller for controlling power flow over the first PCC and a second interface controller for controlling power flow over the second PCC.

9. The microgrid of claim 1, further comprising:
    a third switch configured for, in a closed position, connecting the microgrid to a third network line at a third PCC, and for, in an open position, disconnecting the microgrid from the third network line at the third PCC,
    wherein the control unit is also configured for acting to close the third switch, bringing the third switch from the open position to the closed position, in response to the detected islanding event.

10. A method performed by a control unit for a microgrid connecting at least one distributed electricity generator and comprising a second switch in a closed position, connecting the microgrid to a second network line at a second point of common coupling, PCC, and a first switch in an open position, disconnecting the microgrid from a first network line at a first PCC, the method comprising the steps of:
periodically receiving information about a grid voltage at the first PCC;
detecting an islanding event at the second PCC; and
acting to close the first switch, for bringing the first switch to the closed position, in response to the detected islanding event.

11. The microgrid of claim 2, wherein the first network line is comprised in the same network grid as the second network line.

12. The microgrid of claim 2, wherein the first network line is comprised in a first network grid and the second network line is comprised in a second network grid, different than the first network grid.

13. The microgrid of claim 2, wherein the control unit is also configured for receiving information about a voltage of at least one bus in the microgrid and a power of the distributed electricity generator.

14. The microgrid of claim 3, wherein the control unit is also configured for receiving information about a voltage of at least one bus in the microgrid and a power of the distributed electricity generator.

15. The microgrid of claim 4, wherein the control unit is also configured for receiving information about a voltage of at least one bus in the microgrid and a power of the distributed electricity generator.

16. The microgrid of claim 2, wherein the control unit is also configured for periodically receiving information about a power flow in the microgrid.

17. The microgrid of claim 3, wherein the control unit is also configured for periodically receiving information about a power flow in the microgrid.

18. The microgrid of claim 4, wherein the control unit is also configured for periodically receiving information about a power flow in the microgrid.

19. The microgrid of claim 5, wherein the control unit is also configured for periodically receiving information about a power flow in the microgrid.

20. The microgrid of claim 2, wherein the control unit is also configured for calculating a flow reference for the first PCC when the first switch is in the open position, and for using said power reference for controlling power flow over the first PCC when the first switch is in the closed position.

* * * * *